US010619658B2

(12) United States Patent
Graham

(10) Patent No.: US 10,619,658 B2
(45) Date of Patent: *Apr. 14, 2020

(54) SYSTEMS AND METHODS FOR A SYMMETRICAL LOCKING BRIDGE

(71) Applicant: Brent Williams Graham, Austin, TX (US)

(72) Inventor: Brent Williams Graham, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/682,447

(22) Filed: Nov. 13, 2019

(65) Prior Publication Data

US 2020/0080579 A1    Mar. 12, 2020

Related U.S. Application Data

(63) Continuation of application No. 15/589,602, filed on May 8, 2017, now Pat. No. 10,539,165.

(60) Provisional application No. 62/340,763, filed on May 24, 2016.

(51) Int. Cl.
| *F16B 2/12* | (2006.01) |
| *F16M 13/02* | (2006.01) |
| *G03B 17/56* | (2006.01) |
| *F16B 7/04* | (2006.01) |
| *F16B 2/18* | (2006.01) |

(52) U.S. Cl.
CPC .............. *F16B 2/12* (2013.01); *F16B 2/185* (2013.01); *F16B 7/0433* (2013.01); *F16M 13/022* (2013.01); *G03B 17/561* (2013.01); *G03B 17/566* (2013.01); *F16M 2200/027* (2013.01)

(58) Field of Classification Search
CPC ........ F16B 2/12; F16B 7/0433; F16M 11/041; G03B 17/566; F16L 3/237
USPC ............................................ 248/68.1, 229.24
See application file for complete search history.

(56) References Cited

U.S. PATENT DOCUMENTS

| 893,378 | A | * | 7/1908 | Rosenfeld | F16B 2/12 |
| | | | | | 248/228.3 |
| 2,679,980 | A | * | 6/1954 | Tilley | E01B 5/16 |
| | | | | | 238/288 |
| 4,674,730 | A | * | 6/1987 | Roberts | E01B 11/44 |
| | | | | | 269/152 |
| 4,794,675 | A | * | 1/1989 | Bisconti | B62H 5/00 |
| | | | | | 211/17 |
| 5,685,732 | A | * | 11/1997 | Lane | H01R 13/6392 |
| | | | | | 24/523 |
| 7,452,153 | B2 | * | 11/2008 | Jensen | E04G 1/154 |
| | | | | | 403/49 |
| 7,556,229 | B2 | * | 7/2009 | Elliott | F16B 2/185 |
| | | | | | 224/536 |
| 8,276,864 | B2 | * | 10/2012 | Ye | F16M 11/04 |
| | | | | | 248/287.1 |
| 9,605,775 | B2 | * | 3/2017 | Marsh | F16L 3/237 |
| 9,797,543 | B2 | * | 10/2017 | Lin | E05B 73/0082 |
| 10,128,887 | B2 | * | 11/2018 | Balmer | A45F 5/10 |
| 10,259,400 | B1 | * | 4/2019 | Song | B60R 11/0241 |
| 2014/0263931 | A1 | * | 9/2014 | Chen | F16M 11/041 |
| | | | | | 248/576 |

* cited by examiner

*Primary Examiner* — Bradley Duckworth
(74) *Attorney, Agent, or Firm* — Pierson IP, PLLC

(57) ABSTRACT

A studio bridge clamp comprised of a first element and a second element. Responsive to sliding the first element and the second element along a linear axis of the first element and the second element, the studio bridge clamp creates a clamping force at two locations.

18 Claims, 11 Drawing Sheets

SYSTEMS AND METHODS FOR A SYMMETRICAL LOCKING BRIDGE

CROSS-REFERENCE TO RELATED APPLICATIONS

This application claims a benefit of priority under 35 U.S.C. § 119 to Provisional Application No. 62/2340763 filed on May 24, 2016, which is fully incorporated by reference in its entirety.

TECHNICAL FIELD

Embodiments disclose systems and methods for a symmetrical locking bridge that clamps multiple parallel rods simultaneously. Specifically, embodiments are directed towards a studio bridge for film camera accessories, wherein a clamping motion of the studio bridge is formed based on two opposing elements moving along a linear axis.

BACKGROUND

Currently, to attach accessories to camera bodies a bridge secures pairs of studio rods in place. Typically, a bridge is machined from a single block of aluminum and fully encompasses the studio rods.

While conventional bridges are cheap to manufacture and produce sufficient clamping strength, in order to remove the studio rods it is required to slide the single block of aluminum off the end of the studio rods. This requires forward-mounted rod-based accessories (i.e. lens supports and matte boxes) to be removed in order to remove accessories (i.e. shoulder rig handles and follow focus mounts). To this end, the process may take an unnecessary amount of time.

Other designs may afford the ability to remove themselves from the rods without being slid off the ends. However, these designs use a linear thread for clamping. This requires time to lock/unlock, and prevents accessory mounting on the outside faces of the bridge.

Accordingly, needs exist for a studio bridge clamp comprised of two opposing parts that provides clamping forces in two locations, provides strong clamping forces with minimal adjustment, and leaves the outside end faces available to accessory mounts.

SUMMARY

Embodiments described herein relate to a studio bridge clamp comprised of a first clamping element and a second clamping element with similar end pieces. Responsive to sliding the first clamping element and the second clamping element along a linear axis, the studio bridge clamp creates a clamping force at two locations. This may allow a studio rod bridge to be removed from a studio rod pair without the studio rod bridge being slid off the ends of the studio rod pair. Thus, removal of the studio rod bridge may be more efficient and isolated from other accessories.

Each of the first clamping element and the second clamping element may include a first end, a first projection, a second projection, and a second end. The first end may include a sidewall that is configured to extend away from the first projection and the second projection in a direction that is perpendicular to the first projection and the second projection.

A distal end of the first end may include a curved upper face, wherein the curved face is positioned outside and away from the first projection and the second projection.

The first projection may have a convex inner sidewall, and the second projection may have a concave outer sidewall. The first projection of the first clamping element may be configured to interface with and slide adjacent to the second projection of the second clamping element. Additionally, the first projection of the second clamping element may be configured to interface with and slide adjacent to the second projection of the first clamping element.

End pieces may be removably coupled to the second ends of the first projection and the second projection of both the first clamping element and the second clamping element. The end pieces may include a sidewall that is configured to extend away from the first projection and the second projection in a direction that is perpendicular to the first projection and the second projection.

Upper portions of both of the end pieces may include a curved upper face, wherein the curved upper face is configured to face the curved upper face of a corresponding first end.

Responsive to locking the first clamping element and the second clamping element in place, the studio bridge clamp may simultaneously create a clamping force at two locations. These two locations may be positioned between the end piece associated with the first clamping element and the first end of the second clamping element, and the end piece associated with the second clamping element and the first end of the first clamping element.

Responsive to unlocking the first clamping element and the second clamping element, the clamping forces may simultaneously be removed. This may allow for the studio rod bridge to be removed from the studio rod pair without being slid off the ends, making removal faster and more isolated from other accessories.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention. The invention includes all such substitutions, modifications, additions or rearrangements.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Figure 1:
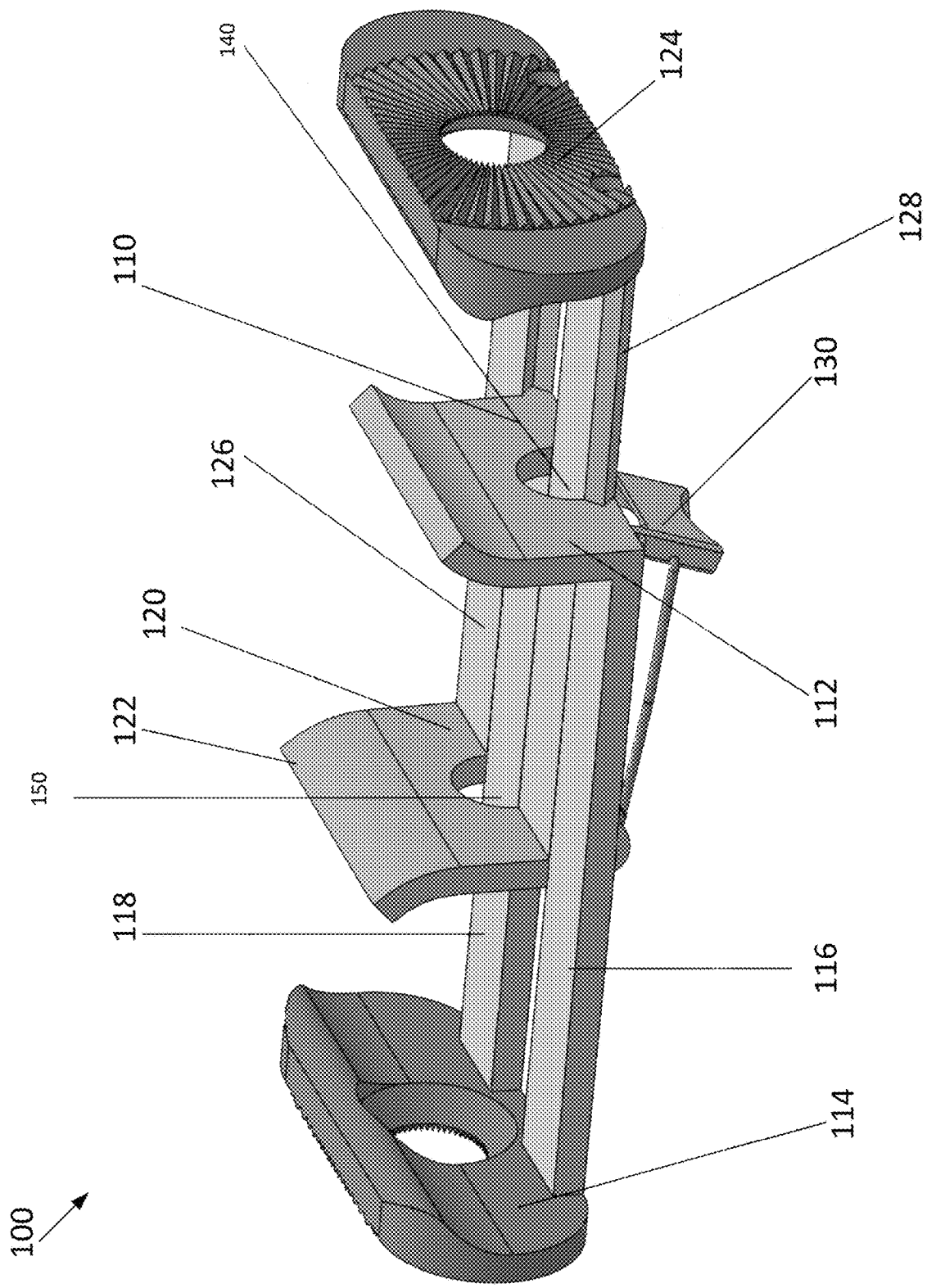
FIG. 1 depicts a studio bridge clamp, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The invention and the various features and advantageous details thereof are explained more fully with reference to the nonlimiting embodiments that are illustrated in the accompanying drawings and are detailed in the following description.

FIG. 1 depicts studio bridge clamp 100, according to an embodiment. Studio bridge clamp 100 may be configured to apply simultaneous clamping forces at two separate locations. Studio bridge clamp 100 may include a first clamping element 110, a second clamping element 120, and locking mechanism 130.

First clamping element 110 may include a first sidewall 112, second sidewall 114, first projection 116, and second projection 118.

First projection 116 and second projection 118 may be configured to extend from first sidewall 112 to second sidewall 114 to form a major axis of studio bridge clamp 100. First projection 116 and second projection 118 may extend in parallel with each other and have the same length. First projection 116 may have convex sidewall, and second projection 118 may have a concave sidewall. First sidewall 112 may be positioned on distal ends of first projection 116 and second projection 118, and second sidewall 114 may be positioned on proximal ends of first projection 116 and second projection 118.

First sidewall 112 may be positioned on a first end of first clamping element 110, and second sidewall 114 may be positioned on a second end of first clamping element 110. First sidewall 112 and second sidewall 114 are connected via first projection 116 and second projection 118. First sidewall 112 may be configured to extend away from an upper surface of first projection 116 and second projection 118 to form a partition, wall, etc. An upper end of first sidewall 112 may include a curved edge, wherein the curved edge faces away from first projection 116 and second projection 118, and may be configured to have a radius complimentary to the radial curve of a film rod. In embodiments, first sidewall 112 may be permanently fixed on the distal ends of first projection 116 and second projection 118. A lower end of first sidewall 112 may have an arch 140, opening, etc., wherein third projection 126 of second clamping element 120 may slide within the opening 140.

Second sidewall 114 may be configured to extend away from an upper surface of first projection 116 and second projection 118 to form a partition, wall, etc. An upper end of second sidewall 114 may include a curved edge, wherein the curved edge faces an interior of studio bridge clamp 100. The curved edge may also face first sidewall 112. In embodiments, second sidewall 114 may be configured to be removable from projections 116 and 118 in order to facilitate assembly.

Second clamping element 120 may include a third sidewall 122, fourth sidewall 124, third projection 126, and fourth projection 128. The elements of second clamping element 120 may correspond to the elements of first clamping element 110 to form a rail system.

Third projection 126 and fourth projection 128 may be configured to extend from third sidewall 122 to fourth sidewall 124 to form a major axis of studio bridge clamp 100. Third projection 126 and fourth projection 128 may extend in parallel with each other and have the same length. Third projection 126 may have convex sidewall, and fourth projection 128 may have a concave sidewall.

Third sidewall 122 may be positioned on proximal ends of third projection 126 and fourth projection 128, and fourth sidewall 124 may be positioned on distal ends of third projection 126 and fourth projection 128. Accordingly, third sidewall 122 may be positioned on a first end of second clamping element 120, and fourth sidewall 124 may be positioned on a second end of second clamping element 120, wherein third sidewall 122 and fourth sidewall 124 are connected via Third projection 126 and fourth projection 128.

Third sidewall 122 may be configured to extend away from an upper surface of Third projection 126 and fourth projection 128 to form a partition, wall, etc. An upper end of third sidewall 122 may include a curved edge, wherein the curved edge faces a perimeter of studio bridge clamp 100. The curved face of third sidewall 122 may be configured to face second sidewall 114, and may be configured to have a radius complimentary to the radial curve of a film rod. A lower end of third sidewall 122 may have an arch 150, opening, etc., wherein first projection 116 of first clamping element 110 may slide within. In embodiments, third sidewall 122 may be permanently fixed to the proximal ends of third projection 116 and fourth projection 118.

Fourth sidewall 124 may be configured to extend away from an upper surface of third projection 126 and fourth projection 128 to form a partition, wall, etc. An upper end of fourth sidewall 124 may include a curved edge, wherein the curved edge faces an interior of studio bridge clamp 100. The curved edge may also face first sidewall 122. In embodiments, fourth sidewall 124 may be configured to be removable from projections 126 and 128 to facilitate assembly. Additionally, in embodiments, the widths of second face 114 and fourth face 124 may be greater than the width of first face 112 and third face 122.

Locking mechanism 130 may be configured to couple first clamping element 110 and second clamping element 120 together in a fixed location. Responsive to locking first clamping element 110 and second clamping element 120 together, a first clamp may be formed between first sidewall 112 of first clamping element 110 and fourth sidewall 124 of second clamping element 120. Additionally, a second clamp may be formed between second sidewall 114 of first clamping element 110 and third sidewall 122 of second clamping element 120. The first clamp and the second clamp may be simultaneously formed with similar shapes and clamping forces, which may allow pairs of studio rods to be secured in place. In embodiments, locking mechanism 130 may be formed of a latch and hook receiver that are configured to move along the central axis of studio bridge clamp 100. Responsive to interfacing the latch within the hook receiver and closing the lock, a length across studio bridge clamp 100 may decrease to create the clamping forces. Responsive to opening the lock, a length across studio bridge clamp 100 may increase allowing studio rods to be inserted between first sidewall 112 and third sidewall 122 as well as between second sidewall 114 and fourth sidewall 124.

Furthermore, the first clamp and the second clamp may be formed proximate to the boundaries of studio bridge clamp 100. Because the first clamp and the second clamp are formed on the boundaries of studio bridge clamp 100, there may be separation between the internal surfaces of first sidewalls 112, 122.

Figure 2:
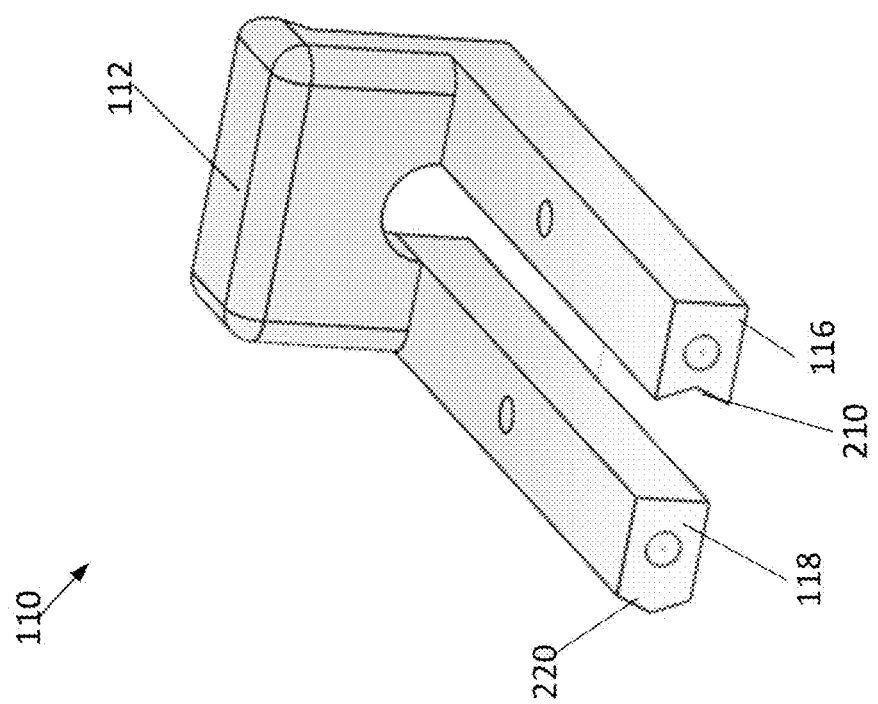
FIG. 2 depicts a first clamping element, according to an embodiment.

FIG. 2 depicts first clamping element 110, according to an embodiment. Because first clamping element 110 may be substantially congruent with second clamping element 120, FIG. 2 may also depict substantially similar elements of second clamping element 120. Elements depicted in FIG. 2 may be described above. For the sake of brevity, a further description of these elements is omitted.

First projection 116 may include a concave internal sidewall 210, and second projection 118 may include a convex external sidewall 220. In embodiments, the shape, size, etc. of concave internal sidewall 210 may be configured to be inserted into a convex external sidewall 320 of second clamping element 120. The shape, size, etc. of convex internal sidewall 220 may be configured to receive a concave internal sidewall 310 of second clamping element 120.

Figure 3:
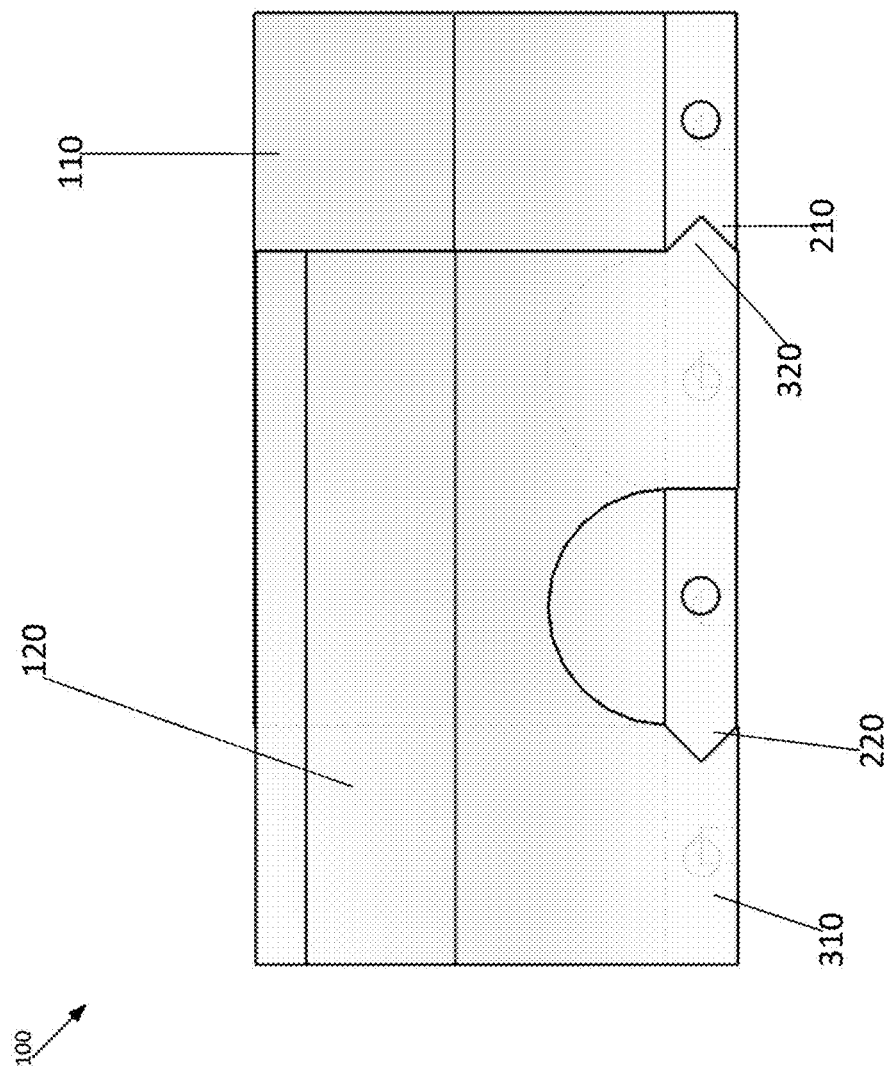
FIG. 3 depicts a front view of a first clamping element and a second clamping element when a first clamping element and a second clamping element are coupled together, according to an embodiment.

FIG. 3 depicts a front view of first clamping element 110 and second clamping element 120 when first clamping element 110 and second clamping element 120 are coupled together, according to an embodiment.

As depicted in FIG. 3, when an internal surface of first sidewall 112 faces an internal surface of second sidewall 122, concave internal sidewall 210 and convex external sidewall 220 may be aligned with the convex external sidewall 320 and concave internal sidewall 310 of second clamping element 120, respectively. This may allow first clamping element 110 and second clamping element 120 to be secured to each other, while allowing first clamping element 110 and second clamping element 120 to both move along a linear axis.

In embodiments, because of the corresponding convex external sidewalls and concave internal sidewalls, when first clamping element 110 and second clamping element 120 are coupled together, it may not be possible for first clamping element 110 and second clamping element 120 to be vertically raised independent of each other.

Figure 4:
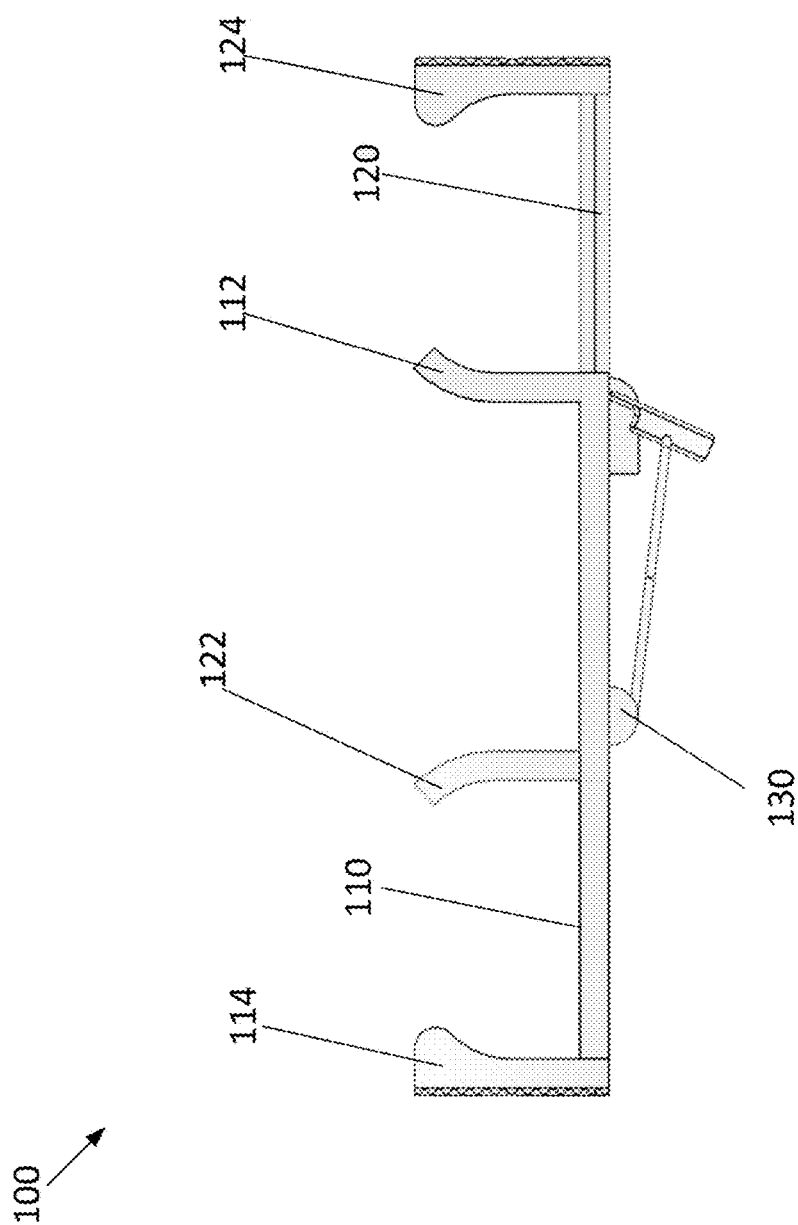
FIG. 4 depicts a studio bridge, according to an embodiment.

FIG. 4 depicts studio bridge 100, according to an embodiment. Elements depicted in FIG. 4 may be described above. For the sake of brevity, a further description of these elements is omitted.

As depicted in FIG. 4, locking mechanism 130 may be opened. When locking mechanism 130 is opened, first clamping element 110 and second clamping element 120 may be configured to slide within each other along a linear axis. Responsive to sliding first clamping element 110 in a first direction or second clamping element 120 in a second direction, the length of studio bridge 100 may decrease. When decreasing the length of studio bridge 100, pairs of studio rods may be clamped and secured in place between internal faces of first sidewall 112 and fourth sidewall 124 and between internal faces of third sidewall 122 and second sidewall 114. In embodiments, studio bridge 100 may decrease in length until the internal faces of the sidewalls are positioned adjacent to the circumference of the studio rods, wherein first clamping element 110 and second clamping element 120 may supply clamping forces between the internal faces at two separate locations.

When sliding first clamping element 110 in the second direction or second clamping element 120 in the first direction, the length of studio bridge 100 may increase. By increasing the length of studio bridge 100, the clamping forces between the internal faces of first clamping element 110 and second clamping element 120 against the studio rods may be simultaneously removed.

Figure 5:
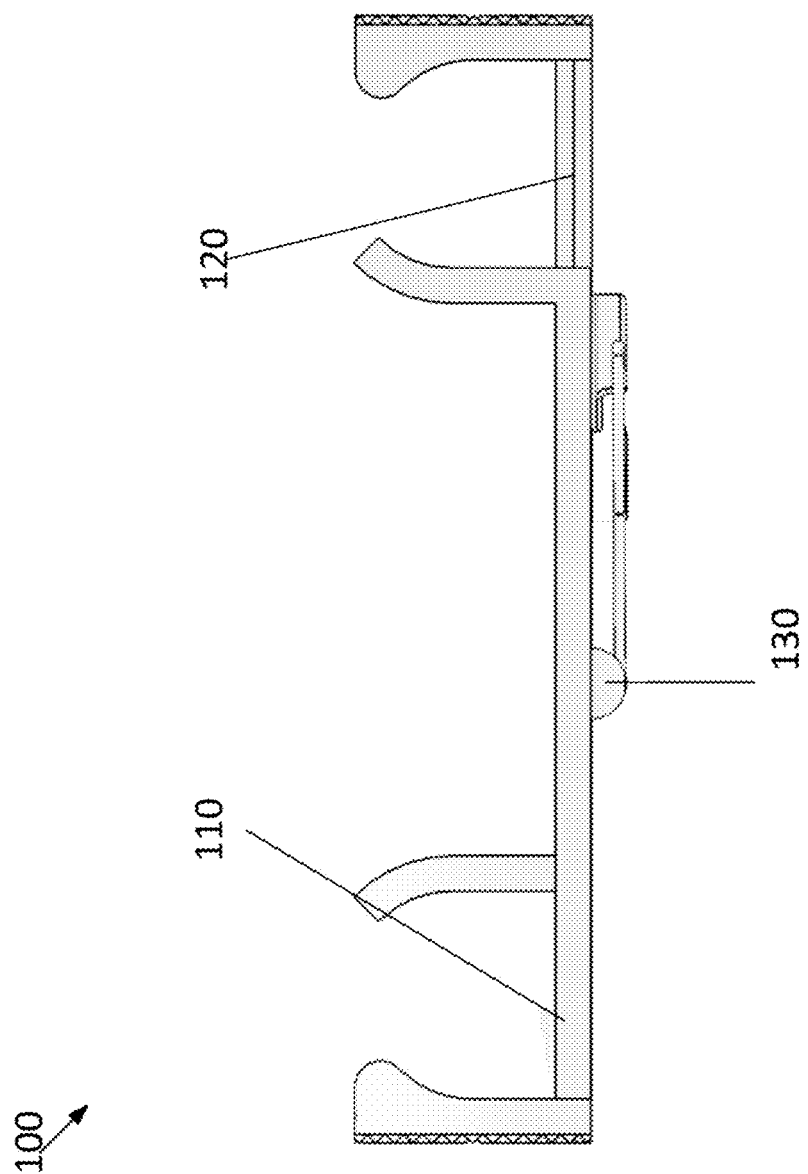
FIG. 5 depicts a studio bridge, according to an embodiment.

FIG. 5 depicts studio bridge 100, according to an embodiment. Elements depicted in FIG. 5 may be described above. For the sake of brevity, a further description of these elements is omitted.

As depicted in FIG. 5, locking mechanism 130 may be closed. Responsive to closing locking mechanism 130, first clamping element 110 and second clamping element 120 may be locked in place and not able to slide along the linear axis. This may create fixed clamping forces between the internal faces of first clamping element 110 and second clamping element 120 at two separate locations. To release the clamping forces, locking mechanism 130 may be required to be opened.

Figure 6:
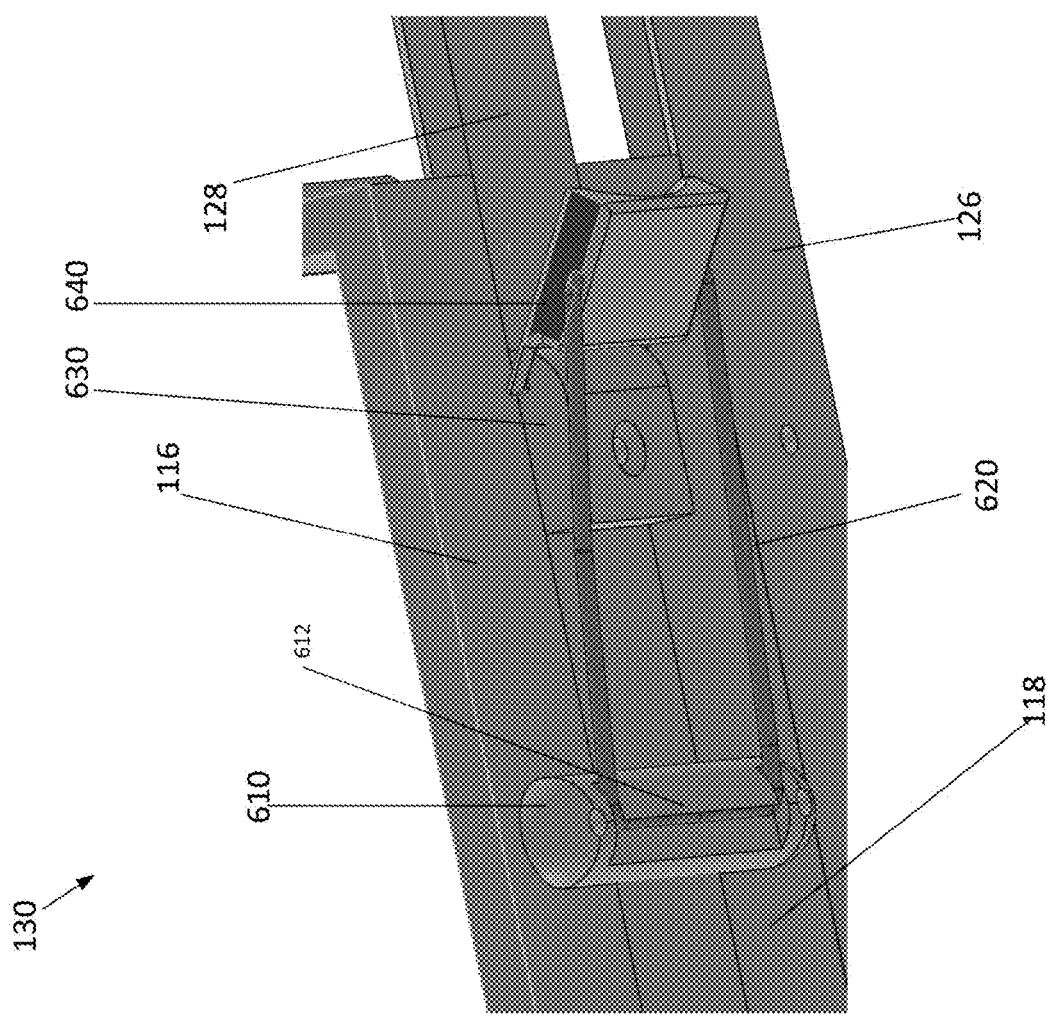
FIG. 6 depicts a locking mechanism, according to an embodiment.

FIG. 6 depicts locking mechanism 130, according to an embodiment. Elements depicted in FIG. 6 may be described above. For the sake of brevity, a further description of these elements is omitted. Although the upper surfaces of first clamping element 110 and second clamping element 120 may be symmetrical, the lower surfaces of first clamping element 110 and second clamping element 120 may differ due to locking mechanism 130.

Locking mechanism 130 may include locking base 610, locking shaft 620, hinge base 630, and locking hinge 640.

Locking base 610 may be positioned across first projection 116 and second projection 118, wherein an upper surface of locking base 610 may be planar with a lower surface of first projection 116 and second projection 118. The planar upper surface of locking base 610 allows fourth projection 128 to slide in the linear axis. More specifically, a lower surface of fourth projection 128 may be configured to be positioned adjacent to and slide on the upper surface of locking base 610. Locking base 610 may include shaft receiver 612. The shaft receiver 612 may be a groove, indention, ridge, etc. that is configure to hold a first end of locking shaft 620 in place.

Locking shaft 620 may be a shaft, tube, band, etc. having a first end being removably coupled to locking base 610 via shaft receiver 612, and a second end fixedly coupled to hinge base 630. In embodiments, locking shaft 620 may be comprised of rigid materials, such as plastics, metal, etc. Alternatively, locking shaft 620 may be comprised of elastic materials, such as rubber. When locking shaft 620 is comprised of elastic materials, locking shaft 620 may be extended and compressed to be different lengths.

Hinge base 630 may be a bump, protrusion, flange, etc. positioned on fourth projection 128. Hinge base 630 may be positioned on a lower surface of fourth projection 128. Hinge base 630 may include indentations, depressions, etc. configured to receive locking hinge 630, and allow locking hinge 630 to rotate around an axis defined by the indentations.

Locking hinge 640 may include tabs, flaps, which are configured to be inserted into the indentions on hinge base 630. Responsive to inserting the tabs into the indentions, locking hinge 640 may rotate. When rotating, a first end of locking hinge 640 may remain in place within the indentions, while a second end of locking hinge 640 may move. By rotating locking hinge 630, a distance between a second end of locking hinge 640 and locking base may change. Locking hinge 640 may also include indentations, depressions, etc. that are configured to receive a second end of locking shaft 620.

In embodiments, when a second end of locking hinge 640 is moved away from fourth projection 128, locking mechanism 130 may be opened. If the second end of locking hinge 640 is positioned adjacent to fourth projection 128, locking mechanism 130 may be closed. When locking mechanism 130 is unlocked, first clamping element 110 and second clamping element 120 may move along the linear axis. However, when locking mechanism 130 is closed, first clamping element 110 and second clamping element 120 may be fixed in position to simultaneously provide clamping forces at two different locations.

Figure 7:
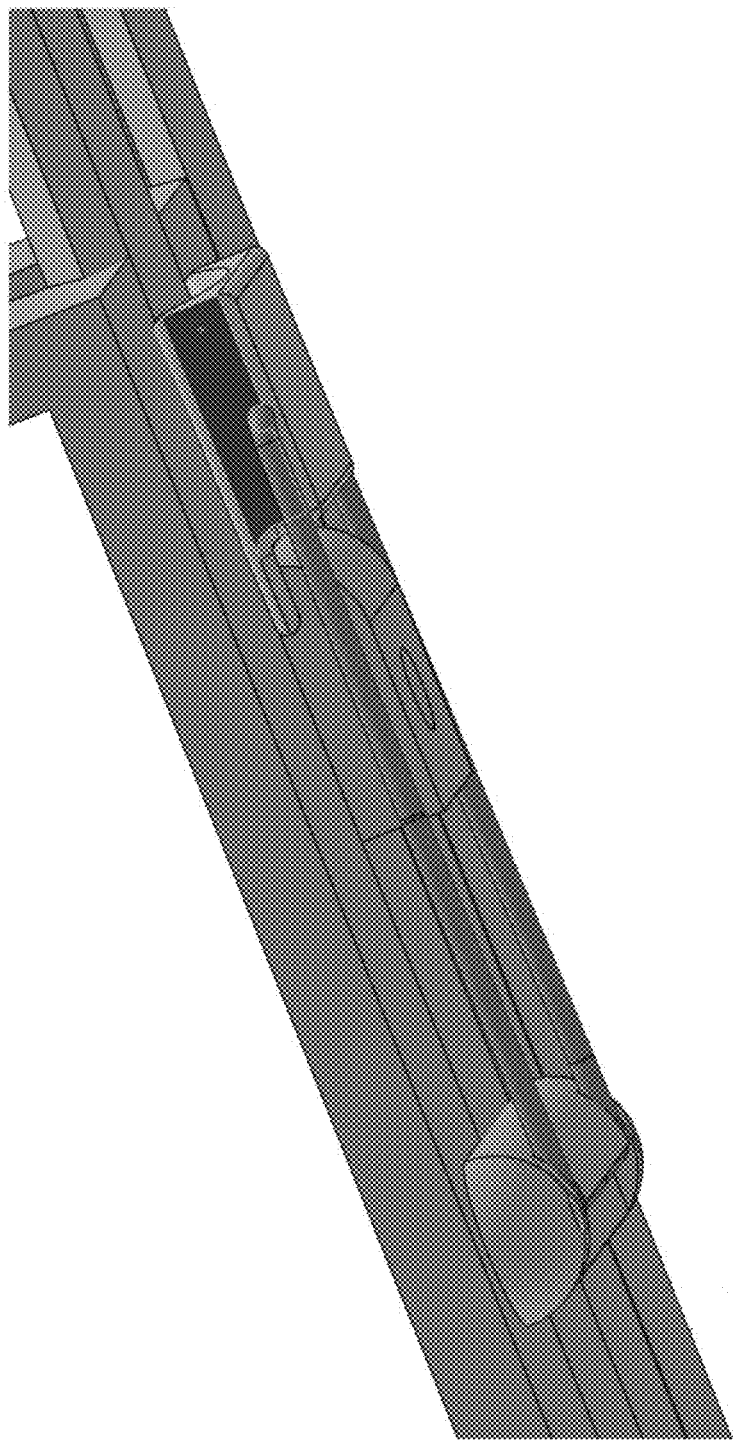
FIG. 7 depicts a locking mechanism, according to an embodiment.

FIG. 7 depicts locking mechanism 130, according to an embodiment. Elements depicted in FIG. 7 may be described above. For the sake of brevity, a further description of these elements is omitted.

FIG. 7 depicts one embodiment of locking mechanism 130 being in the closed position, which may limit the movement of first clamping element 110 and second clamping element 120 along the linear axis.

Figure 8:
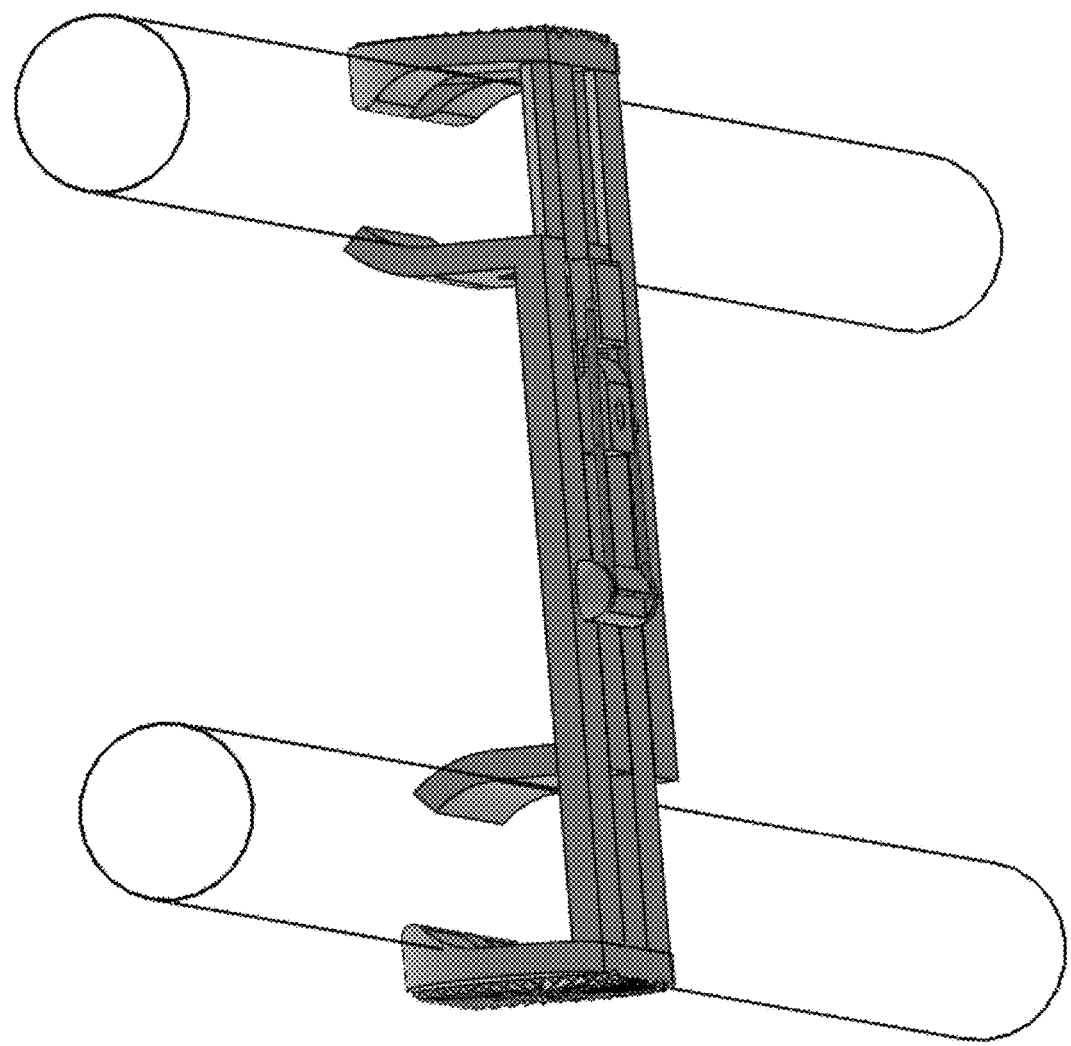
FIG. 8 depicts a studio bridge, according to an embodiment.

FIG. 8 depicts studio bridge 100, according to an embodiment. Elements depicted in FIG. 8 may be described above. For the sake of brevity, a further description of these elements is omitted.

As depicted in FIG. 8, studio bridge 100 may have a locking mechanism that is closed, which may provide clamping forces on two separate studio rods at different locations.

Figure 9:
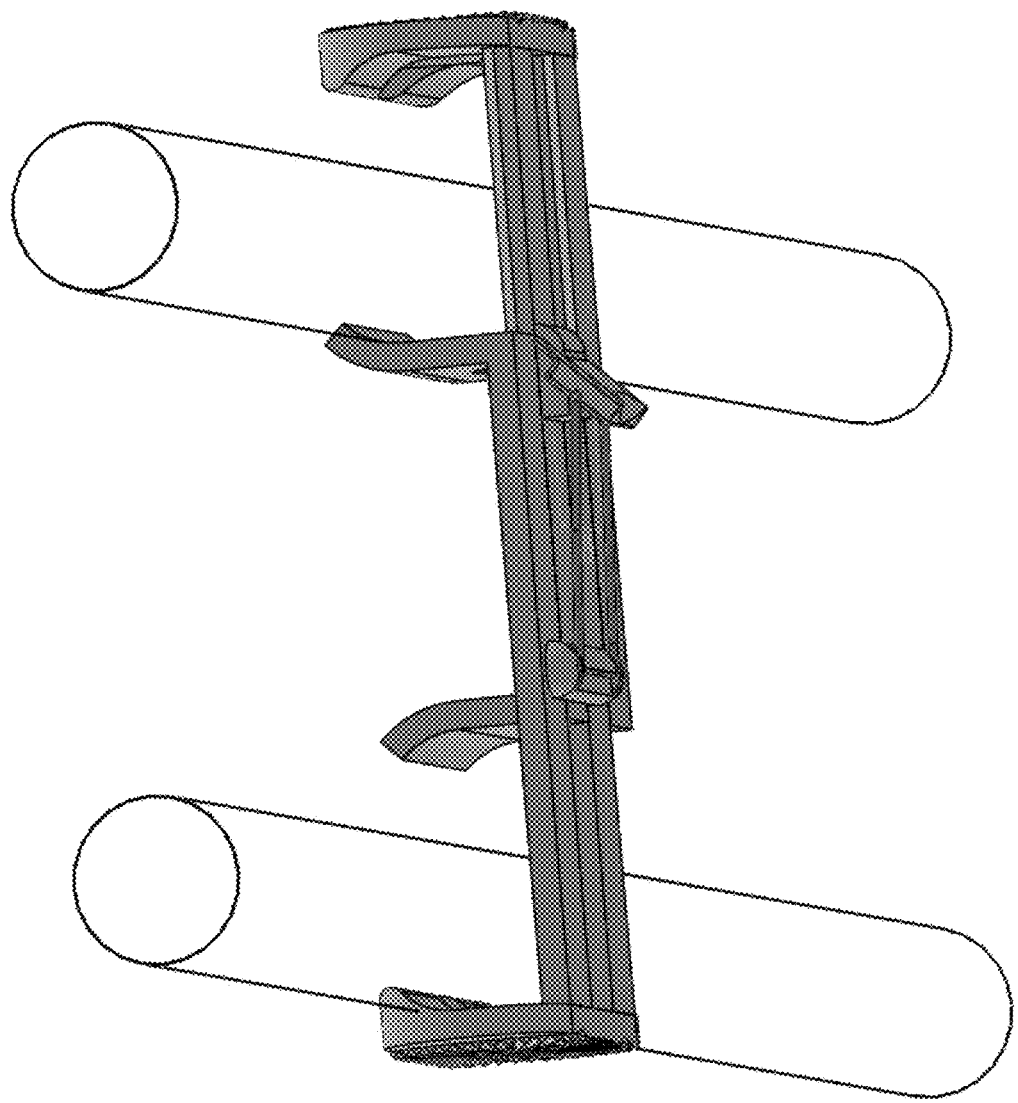
FIG. 9 depicts a studio bridge, according to an embodiment.

Alternatively, as depicted in FIG. 9, the locking mechanism may be opened. When the locking mechanism is opened, the internal sidewalls associated with the first clamping element and the second clamping element may be moved away from the circumference of the studio rods.

Figure 10:
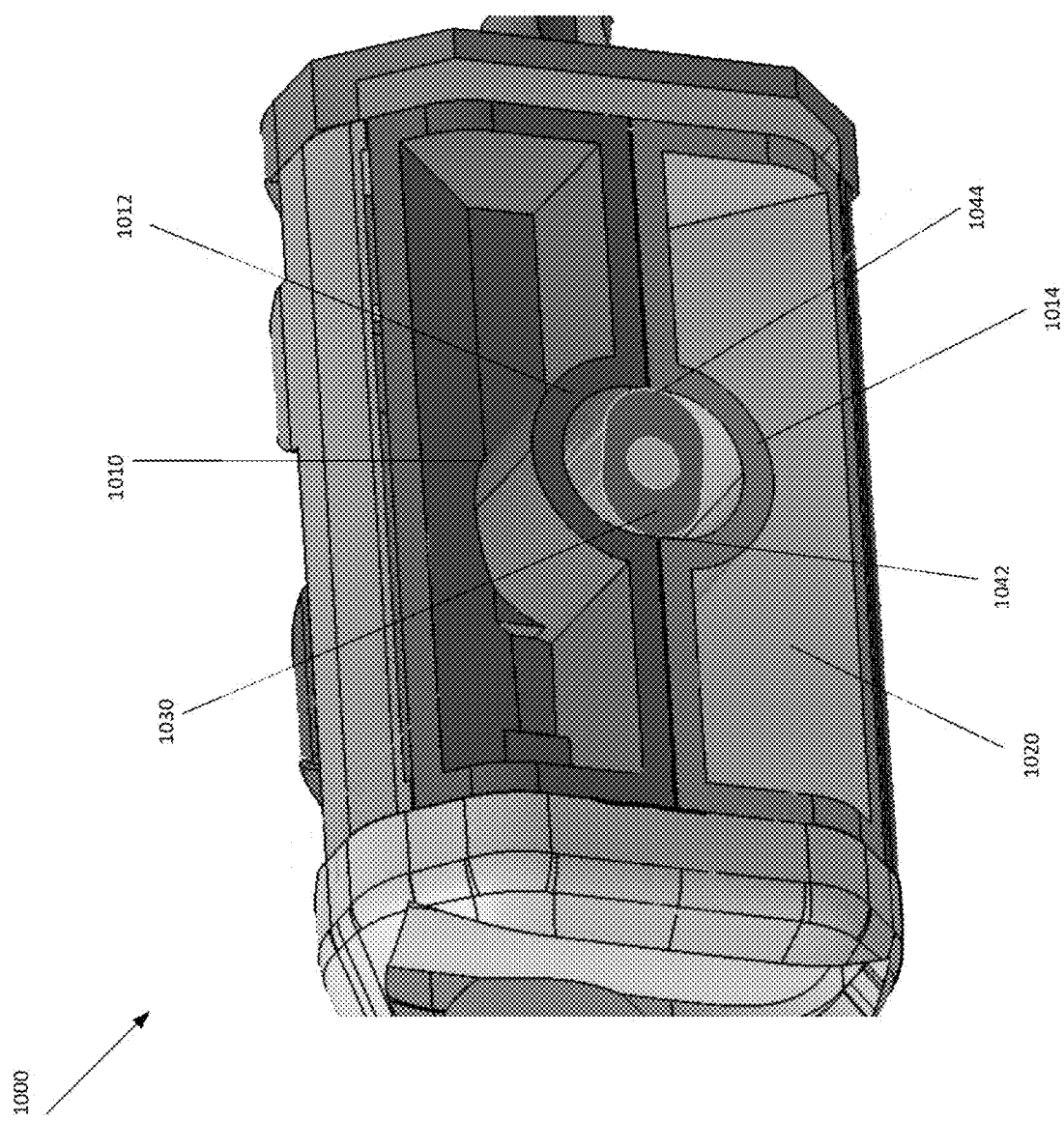
FIG. 10 depicts a studio bridge, according to an embodiment.
Figure 11:
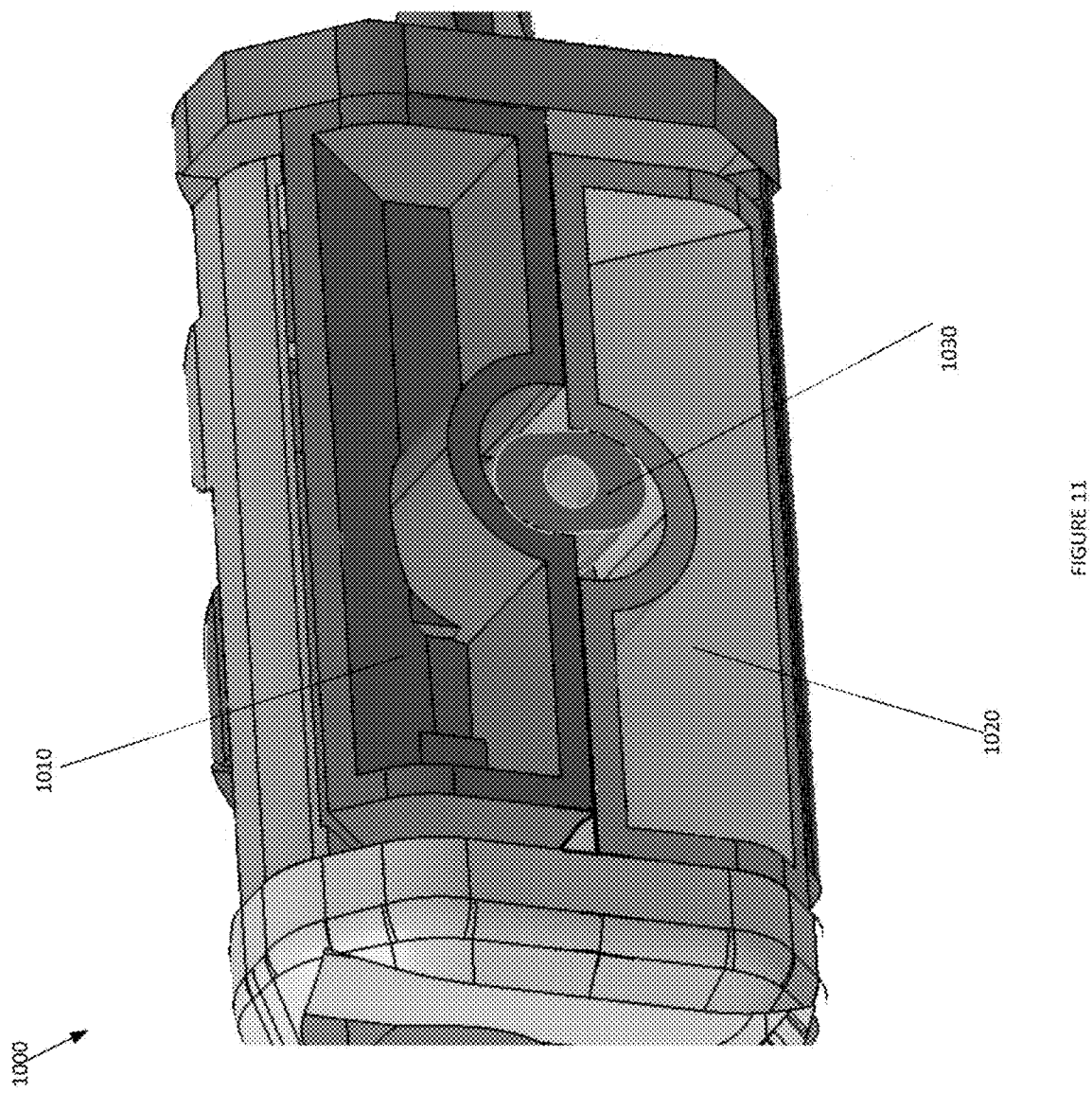
FIG. 11 depicts a studio bridge, according to an embodiment.

FIGS. 10 and 11 depict an alternative embodiment of a locking mechanism 1000.

As depicted in FIGS. 10 and 11, locking mechanism 1000 may include a first plate 1010, a second plate 1020, and rotating member 1030. Specifically, FIG. 10 depicts locking mechanism 1000 being in a locked mode, and FIG. 11 depicts locking mechanism 1000 being in an unlocked mode.

First plate 1010 and second plate 1030 may be configured to move along a linear axis while locking mechanism 1000 is unlocked. More specifically, in an unlocked mode, first plate 1010 may be configured to move in a first linear direction and/or second plate 1020 may be configured to move in a second linear direction, wherein the first linear direction and the second linear direction are opposite directions. In a locked mode, first plate 1010 and second plate 1020 may be configured to be secured in place.

First plate 1010 may be positioned on a first side of a lower surface of a studio bridge, and second plate 1020 may be positioned on a second side of the lower surface of the studio bridge, such that inner surfaces of the plates 1010, 1020 are coplanar. First plate 1010 may have an upper surface that is directly coupled to second sidewall 114, and second plate 1020 may have an upper and outer surface that is directly coupled to fourth sidewall 124.

Responsive to moving first plate 1010 in the linear direction, first projection 116, second projection, 118, second sidewall 114, and first sidewall 112 will correspondingly move. Responsive to moving second plate 1020 in the linear direction, third projection 126, further projection 128, fourth sidewall 124, and third sidewall 122 will correspondingly move.

The inner surfaces of first plate 1010 and second plate 1020 may have two corresponding semi-circles 1012, 1014 that are configured to form a circle in the locked mode, wherein the semi-circles are cutouts within the plates. In the unlocked mode, semi-circles 1012, 1014 are configured to be misaligned and offset in the linear direction.

Rotating member 1030 may be an oval that is configured to be housed within semi-circles 1012, 1014. Rotating member 1030 may be configured to rotate within semi-circles 1012, 1014 to lock and unlock locking mechanism 1000. Rotating member 1030 may have a first end 1042 and a second end 1044 across the long axis of the oval. Responsive to aligning the long axis of the rotating member 1030 with central axis of the studio bridge, locking mechanism 1000 may be in the locked mode. In the locked mode, the space between the semi-circles 1012, 1014 along the central axis may be filled with rotating member 1030 such that first end 1042 is positioned directly adjacent to a first intersection between semi-circles 1012 and 1014, and second end 1044 is positioned directly adjacent to a second intersection between semi-circles 1012 and 1014.

Responsive to turning rotating member 1030 ninety degrees, a short axis of the oval may be aligned with the central axis of the studio bridge. This may position locking mechanism 1000 in an unlocked mode. Due to the short axis of rotating member 1030 being aligned with the central axis of studio bridge, there may be a gap between the intersections of the semi-circles 1012 and 1014. This gap may allow first plate 1010 and second plate 1020 to move along the linear axis.

In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of the invention.

Although the invention has been described with respect to specific embodiments thereof, these embodiments are merely illustrative, and are thus not restrictive of the invention. The description herein of illustrated embodiments of the invention is not intended to be exhaustive or to limit the invention to the precise forms disclosed herein (in particular, the inclusion of any particular embodiment, feature, or function is not intended to limit the scope of the invention to such embodiment, feature, or function).

Rather, the description is intended to describe illustrative embodiments, features and functions in order to provide a person of ordinary skill in the art context to understand the invention without limiting the invention to any particularly described embodiment, feature, or function. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes, and substitutions are intended in the foregoing disclosures. It will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment.

Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:

1. A clamping device comprising:
   a first clamping member with a first face, a second face, and a first rail, the first rail extending between the first face and the second face,
   a second clamping member with a third face, fourth face, and second rail, the second rail extending between the third face and the fourth face, the first rail being positioned adjacent to the second rail, and the first rail extending in parallel to the second rail, wherein the first face is configured to move along a linear axis in a first direction to be positioned closer to the fourth face, and the third face is configured to move along the linear axis in a second direction to be positioned closer to the second face.

2. The clamping device of claim 1, further comprising:
   a first object configured to be positioned between the first face and the fourth face, wherein the first object is configured to receive a first clamping force from the first face and the fourth face, and
   a second object configured to be positioned between the second face and the third face, wherein the second object is configured to receive a second clamping force from the second face and the third face, wherein the first rail includes a concave sidewall, and the second rail includes a convex sidewall, wherein the concave sidewall is configured to be inserted into the convex sidewall.

3. The clamping device of claim 2, wherein the first object and the second object are studio rods.

4. The clamping device of claim 1, wherein the first face and the second face include first curved surfaces, the first curved surfaces being configured to face a first direction.

5. The clamping device of claim 4, wherein the third face and the fourth face include second curved surfaces, the second curved surfaces being configured to face a second direction, wherein the first direction and second direction are opposite directions.

6. The clamping device of claim 5, wherein the first face is configured to be positioned between the third face and the fourth face.

7. The clamping device of claim 6, wherein the third face is configured to be positioned between the first face and the second face.

8. The clamping device of claim 1, further comprising:
   a locking mechanism coupled to the first clamping member and the second clamping member, the locking mechanism being configured to move between an unlocked mode and a locked mode.

9. The clamping device of claim 1, wherein the second face is removable from the first rail, and the fourth face is removable from the second rail.

10. A method for using a clamping device comprising:
    positioning a first rail associated with a first clamping member adjacent to a second rail associated with a second clamping member, the first clamping member including a first face and a second face, the first rail extending between the first face and the second face, the second clamping member including a third face and a fourth face, the second rail extending between the third face and the fourth face;
    moving the first face along a linear axis in a first direction to be positioned closer to the fourth face; and moving the third face along the linear axis in a second direction to be positioned closer to the second face.

11. The method of claim 10, further comprising:
positioning a first object between the first face and the fourth face;
receiving, by the first object, a first clamping force by the first face and the fourth face;
positioning a second object between the second face and the third face;
receiving, by the second object, a second clamping force from the second face and the third face, wherein the first rail includes a concave sidewall, and the second rail includes a convex sidewall, wherein the concave sidewall is configured to be inserted into the convex sidewall.

12. The method of claim 11, wherein the first object and the second object are studio rods.

13. The method of claim 10, wherein the first face and second face include first curved surfaces, the first curved surfaces being configured to face a first direction.

14. The method of claim 13, wherein the third face and the fourth face include second curved surfaces, the second curved surfaces being configured to face a second direction, wherein the first direction and second direction are opposite directions.

15. The method of claim 14, further comprising:
positioning the first face between the third face and the fourth face.

16. The method of claim 15, further comprising:
positioning the third face between the first face and the second face.

17. The method of claim 10, further comprising:
coupling the first clamping member and the second clamping member via a locking mechanism;
moving the locking mechanism between an unlocked mode and a locked mode.

18. The method of claim 10, further comprising:
removing the second face from the first rail; and
removing the fourth face from the second rail.

* * * * *